United States Patent Office 3,360,448
Patented Dec. 26, 1967

3,360,448
PROCESS FOR MODIFYING POLYESTER FILM
BASES USING IRRADIATION
Rudolf Schneider and Karl Heinz Haenisch, Neu-Isenburg, Germany, assignors to E. I. du Pont de Nemours and Company, Wilmington, Del., a corporation of Delaware
No Drawing. Filed Dec. 2, 1963, Ser. No. 327,530
Claims priority, application Germany, Dec. 10, 1962, A 41,836
9 Claims. (Cl. 204—159.19)

ABSTRACT OF THE DISCLOSURE

Process for modifying the surface of modified polyester articles comprising (a) treating the surface with a solution of aqueous hydrogen peroxide in a volatile organic solvent that is a non-solvent for the polyester, and (b) treating the wet surface with ultraviolet radiation.

---

This invention relates to a process for modifying the surface characteristics of shaped articles, especially films of highly polymeric polyesters. More particularly, it relates to a process for imparting hydrophilic character to the surface of hydrophobic films of biaxially oriented polymethylene terephthalates and related polyesters.

It is a familiar fact that foils made from hydrophobic superpolymers are being used more and more in recent times as carriers or film bases for photosensitive materials, since such foils are much superior in physical and mechanical properties to the conventional film bases derived from cellulose esters. Among all the many types of hydrophobic superpolymers which have been proposed for the purpose, the polyesters of terephthalic acid have given outstanding results in practice. Such film bases, which have exceptional strength and dimensional stability, do have the serious drawback that they are only very difficultly amenable to substrate formation because, compared to cellulose ester foils, the polyester foils are much more hydrophobic and therefore display far less affinity for the hydrophilic or water-permeable organic colloid layers, including photosensitive emulsions. Moreover, polyester foils are extraordinarily resistant to solvents, so that it is usually not possible to achieve the requisite preswelling for satisfactory substrate formation, even when highly aggressive solvents are employed. Among other expedients it is known in the art to treat such foils with oxidizing agents, for example with chromic acid, which is dissolved in concentrated sulfuric acid for use; or in accordance with another process, with peroxides associated with concentrated solutions of strong alkalies. Aside from the fact that such pretreated bases usually have harmful effects on the photosensitive emulsions, these processes require extensive equipment for washing and drying because the residues remaining on the foil surface after drying must be removed by washing.

In addition, staining and dulling of the foil occur, particularly when chromic acid is used, and this is by no means desirable in view of the intended use.

An object of this invention is to provide a simple and practical process for modifying the surface characteristics of shaped articles, especially flexible films, of highly polymeric polyesters. Another object is to provide such a process which does not require expensive washing and drying equipment. Still other objects will be apparent from the previous discussion of the prior art and the following description of the invention.

It has now been found that the drawbacks discussed above can be overcome and the above objects attained in accordance with the process of this invention which comprises (a) treating the surface of a shaped article of a hydrophobic highly polymeric polyester, preferably a polyester of (1) at least one glycol of the formula $$HOCH_2-R_n-CH_2OH$$

where R is a divalent hydrocarbon radical selected from the group consisting of unsubstituted polymethylene and alkyl-substituted polymethylene of 1–8 carbon atoms and cycloalkylene of 5–6 carbons and $n$ is one of the cardinal numbers 0 and 1, and (2) at least one dicarboxylic acid selected from the group consisting of aliphatic and aromatic dicarboxylic acids, said polyester containing at least 15 mole percent of terephthaloyl groups, with an essentially neutral to weakly acidic solution of aqueous hydrogen peroxide in a volatile organic solvent that is essentially a non-solvent for said polyester; and (b) exposing the treated surface of said article while still in a wet state with intensive ultraviolet radiation. The exposed element is then dried in a suitable zone having means for removing the water and solvent vapors.

When hydrophobic polyester films containing a substantial amount of terephthaloyl groups are so treated, the surface is modified and acquires hydrophilic properties and has excellent properties of adhesion to aqueous coating solutions or dispersions of water-permeable organic colloids of high molecular weight including gelatinosilver halide emulsions, and to the vinylidene chloride copolymer layers of U.S. Patent 2,627,088.

The use of ultraviolet light is known in the art for achieving adhesive union between film bases and photographic emulsions. Thus, for example, attempts have been made in the prior art to improve the adhesive quality of cellulose ester foils by subjecting the dried foil to an after-treatment with ultraviolet light. But so far this method has given no satisfactory results with the polyesters given above. According to this invention, in which a film or foil which has been treated with a solvent or solvent blend containing hydrogen peroxide, only when it is exposed while still in the moist state, to intensive ultraviolet irradiation, does one obtain foils having satisfactory adhesion to the photosensitive layer. The adhesion is not only satisfactory in the dry state but also the wet adhesion, e.g., in photographic baths, is satisfactory.

The invention is especially useful in treating biaxially oriented hydrophilic films from 0.001 to 0.008 inch in thickness, especially polyethylene terephthalate films.

The process according to this invention is also particularly distinguished by the fact that no nonvolatile substances are applied to the foil. This has the advantage that no residues are left after the customary drying to require removal by washing operations, and the foil surface after substrate formation is externally unchanged and shows no turbidity or the like.

Ordinary commercial ultraviolet lamps serve as the source of ultraviolet light. Both the so-called high-pressure lamps, which emit ultraviolet light with many spectral lines of wavelength 185 to 400 m$\mu$, and the so-called low-pressure lamps, supplying a practically monochromatic ultraviolet light, e.g., of 254 m$\mu$, are equally suitable.

Practical operation of the process according to this invention is somewhat as follows: The foil strip, wetted by immersion in the liquid organic solvent or solvent blend containing hydrogen peroxide, is irradiated immediately after it is taken out, and while it is still wet, with an ultraviolet lamp at a distance of about 5 cm., and after irradiation time of 5 or less to 80 or more seconds it is dried at an elevated temperature.

But it is also possible and easy to provide continuous ultraviolet irradiation in the following way: The web of foil, wetted with the volatile organic solvent or solvent blend containing hydrogen peroxide by the usual method, e.g., dipping, is passed immediately thereafter at the smallest possible distance (about 5 cm.) along the ultraviolet generator so that every part of the foil surface is exposed for about 60 seconds to the ultraviolet light. The size and shape of the irradiating surface and the arrangement of the ultraviolet lamp are adapted to the desired rate of foil motion. Taking into consideration the boiling points of the solvents in use, the temperature in the irradiation zone is to be selected so that the foil traverses the ultraviolet zone in the moist state. The web of foil is then dried in the customary way with hot air and may then be provided with a photosensitive photographic gelatin-silver halide emulsion or with an antihalation layer of gelatin and a suitable dye.

Practically all solvents having a suitable boiling point or vaporization index are suitable for use as solvents; the boiling point should be so selected that the foils, in view of the temperature in the irradiation zone, will traverse this zone in the solvent-wet state. The boiling point range 50–150° C. has proved to be applicable. Of course, the solvent or solvent blend must have such a character that it can dissolve the aqueous hydrogen peroxide which is employed, and volatile water-permeable solvents only are preferably employed. However, even water-insoluble solvents such as chlorinated hydrocarbons can be employed if they are cut by adding water-miscible solvents, and the former solvents beneficially lower the flammability of the blend. Volatile organic ethers, e.g. especially diisopropyl ether, as also dioxane and like solvents, have proved to be especially advantageous as solvents giving good adhesion. In many cases it is beneficial to add an organic acid, e.g., acetic acid. Suitable additional water-miscible volatile organic solvents include methanol, ethanol, isopropanol, acetone, methyl ethyl ketone, and mixtures of two or more of the solvents listed above.

The hydrogen peroxide is most suitably used in the form of its 33% aqueous solution, generally in amounts of 0.1–10% calculated on the solvent or solvent blend, which corresponds to a concentration of about 0.03 to 3.3% $H_2O_2$.

The invention will be further illustrated by the following examples wherein biaxially oriented foils were treated.

EXAMPLE 1

A polyethyleneglycol terephthalate specimen foil, 5 x 10 cm. in size, is wetted by immersion for 1 second in a solution consisting of

|  | Vol. percent |
|---|---|
| Diisopropyl ether | 99.5 |
| Hydrogen peroxide, 33% | 0.5 | and is immediately exposed to the irradiation from a high-pressure mercury vapor lamp of 70-watt capacity, with arc length 2 cm. and 1 cm. diameter of the luminous tube. The lamp is situated at a distance of 5 cm. from the foil. After 1.5 min. of irradiation time at 25° C., the specimen foil is dried 15 min. at a temperature of 70° C. in a drying zone or chamber provided with vapor exits, and is then coated on the irradiated side with a photosensitive aqueous gelatin-silver halide emulsion. After drying, the emulsion adheres firmly to the foil and later even in the wet state it remains firmly anchored to the base during and after developing fixing and washing.

EXAMPLE 2

A web of polyethyleneglycol terephthalate foil 30 cm. wide is wetted by the dipping method at a rate of 1.5 m./min. with a solution consisting of

|  | Vol. percent |
|---|---|
| Ethylene chloride | 45 |
| Acetic acid, 99% | 45 |
| Hydrogen peroxide, 33% | 10 | and immediately after leaving the dipping vat is led past an ultraviolet irradiation setup at a distance of 5 cm. and at a rate of 1.5 m./min. The irradiation setup consists of 20 low-pressure mercury vapor lamps having arc length 33 cm. each, with 1.5 cm. diameter of the luminous tube and capacity of 15-watt each. The individual lamps are disposed with their longitudinal axes perpendicular to the foil web direction at intervals of 10 cm. each, in such a way that a surface 2 m. long and 30 cm. wide is uniformly irradiated. In connection with the foil speed of 1.5 m./min. the irradiation time is thus 1.3 min. The temperature in the irradiation zone is adjusted to 35–40° C. After irradiation the web of foil traverses for 1 min. a drying zone at 100° C. and is then wound. The foil, thus treated, is then coated on the irradiated side, by the customary process, with a photosensitive aqueous gelatin-silver halide emulsion, and when the emulsion is dried it yields a firmly adhesive union, both dry and wet, before, during and after developing, fixing and washing.

In foregoing Examples 1 and 2 the gelatin-silver halide emulsions were silver-chloride-bromide emulsions containing 70 mole percent chloride and 30 mole percent bromide and the high pressure lamps had an electrical output of 70 watts and an ultraviolet radiation output of 10–15 watts, and an electrical output of 15 watts and an ultraviolet radiation output of 5 watts, respectively.

The anchorage of the emulsion coating to the treated base was measured by making several intersecting cuts through the emulsion layer into the treated film base of one of the treated coated film sheets, placing a pressure-sensitive adhesive tape having a regenerated cellulose film base over the cuts, and sharply pulling the adhesive tape back. Upon inspection, no separation of the emulsion from the treated film base was observed. The anchorage of the emulsion coating to the treated base was measured during all conventional processing operations including developing, fixing and washing. Sample sheets were removed respectively from the developer, fixer and washing bath and several intersecting cuts were made through the wet emulsion layer into the treated film bases. While the film sheets were still wet, attempts were made to slide the emulsion layer from the treated bases. Excellent adhesion was obtained during all phases of processing with the emulsion layer remaining intact.

Of course, it is also directly possible to apply a suitable treatment to the back side of the foil, or to extend the process to the widths of foil which are customary in the photographic industry.

The invention is, of course, not limited to the treatment of the surfaces of the particular polyesters of the foregoing examples. Similar results can be obtained by treating films or foils composed of any of the high-melting, difficultly soluble, usually microcrystalline, cold-drawing linear, highly polymerized esters of terephthalic acid and glycols of the series $HO(CH_2)_nOH$, where $n$ is an integer within the range of 2 to 10, described in Whinfield et al. U. S. Patent 2,465,319. Other useful polyester articles which can be treated include those prepared from highly polymerized esters of terephthalic acid and at least one glycol of the formula $HOCH_2—W_n—CH_2OH$ where $n$ is 0 or 1 and W is methylene or polymethylene alkyl-substituted polymethylene of 1 to 8 carbons, e.g., 2,2-dimethylpropylene-1,3 or a cycloalkylene radical of 5 to 6 carbon atoms, e.g., cyclopentyl-1,3, and cyclohexyl-1,4. In addition, articles prepared from copolyesters comprising up to 85 mole percent isophthalic acid and 15% or more of terephthalic acid components such as are disclosed in British patent specification 766,290 can be used. Films or foils comprising up to 20 mole percent of aliphatic dicarboxylic acids based on total moles of acid, e.g., succinic, glutaric, adipic, hexahydroterephthalic and sebacic acids, in addition to at least 15 mole percent terephthalic acid are also useful. The above-described polymers may contain a number (e.g., 1 to 12 or more) of ether groups in the polymer chain. Such ether groups may be added as part of ether-containing glycol derivatives or formed by side reactions during polymerization.

The photographic film base obtained in accordance with the process of this invention has improved adherence to many types of coatings including silver halide emulsions of all types, e.g., silver chloride, silver bromide and silver iodobromide emulsions; light-sensitive diazo; light-sensitive bichromate; photopolymerizable layers as described in Plambeck U.S. Patent 2,791,504; other layers described in U.S. Patent 3,035,915 and various layers of drafting films, e.g., those of Van Stappen U.S. Patent 2,964,423.

An advantage of the invention is that it is simple and utilizes economical chemicals and solvents. Another advantage is that extensive washing treatments are avoided. A further advantage is that inexpensive equipment can be used as highly corrosive chemicals are not used.

An important advantage of the invention is that a high degree of adherence between the treated film base and water-permeable organic colloid layer can be obtained.

What is claimed is:

1. A process for modifying the surface of a hydrophobic highly polymeric polyester shaped article which comprises
    (a) treating the surface of such an article with an essentially neutral to weakly acidic solution of aqueous hydrogen peroxide in a volatile organic solvent that is essentially a non-solvent for the polyester, and
    (b) exposing the treated surface of said article while still in a wet state with ultraviolet radiation.

2. A process for modifying the surface of a hydrophobic highly polymeric polyester film which comprises
    (a) treating the surface of such an article with an essentially neutral to weakly acidic solution of aqueous hydrogen peroxide in a volatile organic solvent that is essentially a non-solvent for the polyester, and
    (b) exposing the treated surface of said article while still in a wet state with ultraviolet radiation, and
    (c) drying the radiation-exposed film.

3. A process according to claim 2 wherein said polyester contains at least 30 mol percent terephthaloyl groups.

4. A process according to claim 2 wherein said polyester is polyethylene terephthalate.

5. A process according to claim 2 wherein said solvent is diisopropyl ether.

6. A process according to claim 2 wherein said solvent is a mixture of diisopropyl ether and acetic acid.

7. A process according to claim 2 wherein the polyester film is a biaxially oriented film.

8. A process which comprises
    (a) treating the surface of a shaped article of a hydrophobic polyester of
        (1) at least one glycol of the formula $$HOCH_2—R_n—CH_2OH$$

where R is a divalent hydrocarbon radical selected from the group consisting of unsubstituted polymethylene and alkyl-substituted polymethylene of 1–8 carbon atoms and cycloalkylene of 5–6 carbons and $n$ is one of the cardinal numbers 0 and 1, and
        (2) at least one dicarboxylic acid selected from the group consisting of aliphatic and aromatic dicarboxylic acids, said polyester containing at least 15 mole percent of terephthaloyl groups,
    with an essentially neutral to weakly acidic solution of aqueous hydrogen peroxide in a volatile organic solvent that is essentially a non-solvent for said polyester; and
    (b) exposing the treated surface of said article while still in a wet state with intensive ultraviolent radiation.

9. A process according to claim 8 wherein the polyester film is a biaxially oriented film.

References Cited

FOREIGN PATENTS 1,078,437  9/1966  Germany.

MURRAY TILLMAN, Primary Examiner.

SAMUEL H. BLECH, Examiner.

R. B. TURER, Assistant Examiner.